US007097818B2

(12) United States Patent
Lindner et al.

(10) Patent No.: US 7,097,818 B2
(45) Date of Patent: Aug. 29, 2006

(54) SILICA AND SILICATE BY PRECIPITATION AT CONSTANT ALKALI NUMBER, AND ITS USE

(75) Inventors: Gottlieb-Georg Lindner, Wesseling (DE); Robert Kuhlmann, Erfstadt (DE); Claus-Peter Drexel, Neu-Isenburg (DE)

(73) Assignee: Degussa AG, Duesseldorf (DE)

( * ) Notice: Subject to any disclaimer, the term of this patent is extended or adjusted under 35 U.S.C. 154(b) by 26 days.

(21) Appl. No.: 11/045,122

(22) Filed: Jan. 31, 2005

(65) Prior Publication Data

US 2005/0137317 A1 Jun. 23, 2005

Related U.S. Application Data

(62) Division of application No. 10/079,479, filed on Feb. 22, 2002.

(30) Foreign Application Priority Data

Mar. 15, 2001 (DE) .............................. 101 12 441

(51) Int. Cl.
*C01B 33/20* (2006.01)
*C01B 33/26* (2006.01)

(52) U.S. Cl. ............ 423/326; 423/327.1; 423/328.1; 423/328.2; 423/330.1; 423/331; 502/439; 106/287.1

(58) Field of Classification Search ........... 423/326, 423/327.1, 328.1, 328.2, 331, 330.1; 502/439; 106/287.1
See application file for complete search history.

(56) References Cited

U.S. PATENT DOCUMENTS

| 4,001,379 | A | | 1/1977 | Tuerk et al. |
| 4,581,292 | A | * | 4/1986 | Shinpo et al. ............... 423/326 |
| 5,484,581 | A | | 1/1996 | Esch et al. |
| 5,547,502 | A | * | 8/1996 | Chevallier et al. .......... 423/326 |
| 5,705,137 | A | | 1/1998 | Goerl et al. |
| 5,846,506 | A | | 12/1998 | Esch et al. |
| 5,859,117 | A | | 1/1999 | Goerl et al. |
| 5,871,867 | A | | 2/1999 | Rausch et al. |
| 5,925,708 | A | | 7/1999 | Esch et al. |
| 5,935,543 | A | * | 8/1999 | Boyer et al. ................ 423/339 |
| 6,107,226 | A | | 8/2000 | Chevallier |
| 6,214,383 | B1 | | 4/2001 | Esch et al. |
| 6,268,424 | B1 | * | 7/2001 | Blume et al. ............... 423/335 |
| 2001/0051176 | A1 | | 12/2001 | Viot |
| 2002/0102198 | A1 | | 8/2002 | Kuhlmann et al. |
| 2002/0112647 | A1 | | 8/2002 | Lindner et al. |
| 2002/0169248 | A1 | | 11/2002 | Esch et al. |
| 2004/0047792 | A1 | | 3/2004 | Schubert et al. |

FOREIGN PATENT DOCUMENTS

| EP | 0 754 650 | 1/1997 |
| EP | 0 755 899 | 1/1997 |
| EP | 0 901 986 | 3/1999 |
| WO | WO 99/07237 | 2/1999 |

\* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

Precipitated silica or silicates, obtainable by acid precipitation of aqueous silicate solutions while maintaining a constant alkali number of at least 1.

20 Claims, No Drawings

SILICA AND SILICATE BY PRECIPITATION AT CONSTANT ALKALI NUMBER, AND ITS USE

CROSS-REFERENCE TO A RELATED APPLICATION

The present application is a divisional of U.S. Ser. No. 10/079,479, filed on Feb. 22, 2002.

BACKGROUND OF THE INVENTION

1. Field of the Invention

The invention relates to silicas and silicates obtained and obtainable by acid precipitation of alkali metal silicates at constant alkali number, and to their use, for example as carriers.

2. Discussion of the Background

Precipitated silicas as carrier materials, particularly for vitamin E acetate or choline chloride have long been known. For example, EP 0 937 755 describes how a precipitated silica is prepared by a pH-controlled precipitation reaction and then spray-dried. Precipitated silica prepared in this way is particularly suitable for use for adsorbing liquid active substances such as choline chloride solution or vitamin E, for example. DE 198 60 441 discloses how an active substance adsorbate may be prepared from a precipitated silica and an active substance by spraying or injecting a silica suspension together with one or more active substances into a fluidized bed generated using hot air. It is likewise possible to use hydrophobic precipitated silicas for these purposes, as described in DE 198 25 687.

In the context of their use as carriers, the following properties of silicas are important:

adsorption capacity, good sorption kinetics, and low fine dust fraction. Owing to heightened safety requirements and the need to prepare adsorbates with ever higher concentrations, there is therefore a demand for carrier silicas which have a very low fines fraction with an adsorptiveness which is heightened at the same time.

OBJECTS OF THE INVENTION

The known silicas generally do not possess pronounced sorption characteristics for polar compounds. Since silicas are frequently used as carrier material for polar compounds such as choline chloride, propionic acid or formic acid, for example, it is one object of the present invention to provide a silica and a silicate which possesses particularly good sorbency for polar compounds.

SUMMARY OF THE INVENTION

It has surprisingly been found that by preparing precipitated silica and silicate at a constant alkali number, products can be obtained which have good sorption characteristics for polar compounds.

DETAILED DESCRIPTION OF THE INVENTION

The present invention provides such precipitated silicas and silicates as well as a process for preparing such materials comprising optionally providing an initial aqueous silicate solution simultaneously metering into an aqueous silicate solution or a vessel, etc., an aqueous silicate solution and a Lewis and/or Brønsted acid to provide a mixture reacidifying the mixture to a pH of 7–3.0 optionally filtering, and optionally drying, the metered addition (or mixing, etc.) of the aqueous silicate solution and the Lewis and/or Brønsted acid being carried out while maintaining a constant alkali number of at least 1.

Where an aqueous silicate solution is initially present it is generally different from the silicate solution metered in as concentrations generally differ due to the initial presence of water. See infra.

While not bound by theory it is believed that the high alkali number of the silicas and silicates of the invention, and the inventively prepared precipitated silicas and silicates, results in a high silanol group density and thus enhances a high absorbency for polar absorbates.

The present invention likewise provides for the use of the silicas and silicates of the invention as carrier material, for example for feed additives, chemical intermediates, or in the laundry detergent industry, for example.

It is possible to add an electrolyte prior to or during the simultaneous addition (or metering) of aqueous silicate solution and acid. Electrolytes for the purposes of the present invention are not limited and include metal salts or their aqueous solutions which are not incorporated into the amorphous $SiO_2$ structure, such as Na, K, Rb, Ba, in each case in sulfate, acetate, halide or carbonate form. The fraction of the electrolyte is 0.01–26% by weight (calculated as the metal ion) based on total weight of product silica or silicate.

It is likewise possible to add metal salts or their solutions which are incorporated into the $SiO_2$ structure to the precipitation mixture, so giving silicates. The fraction of these metal ions may be between 1 and 50, preferably 10% by weight based on total weight of silicate;

customary ions are Al, Zr, Ti, Fe, Ca and Mg.

There are known preparation processes for precipitated silicas in the course of which a constant pH is maintained. A precipitation reaction at constant alkali number, on the other hand, means that the concentration of freely available alkali ions (e.g., sodium ions) is kept constant.

As a result of the acid-base reactions during the precipitation of waterglass with sulfuric acid, sodium ions are on the one hand released in the form of sodium sulfate; on the other hand, sodium ions are incorporated into the silicate agglomerates which form.

Since these two reactions proceed independently of one another kinetically, the course of precipitations at constant pH is different than that of precipitations conducted in accordance with the invention.

In the case of a precipitation reaction at constant alkali number, the pH changes analogously: for example, at a constant alkali number of 30, the pH falls from about 10.35 to levels between 8 and 10, depending on the duration of the precipitation reaction (simultaneous addition of alkaline silicate solution and acid). The longer such a precipitation reaction lasts, the lower the pH at the end of the reaction is. The intercalation of sodium ions into the silica structure is probably responsible for this.

The precipitated silicas and silicates of the invention are prepared at an alkali number of at least 1, in particular at least 15, preferably at an alkali number of from 15 to 60, with particular preference at an alkali number of from 25 to 50, and with very particular preference at an alkali number of from 30 to 40, including all of 2, 5, 10, 15, 20, 30, 31, 32, 33, 34, 35, 36, 37, 38, 39, 45 and 55, the alkali number being kept constant during the precipitation reaction.

The alkali number (AN) is determined by measuring the consumption of hydrochloric acid in a direct potentiometric titration of the precipitation suspension at a pH of 8.3, i.e., the color change point of phenolphthalein. The consumption of hydrochloric acid is a measure of the free alkali content of the solution or suspension. Owing to the temperature dependency of the pH, this measurement is made at 40° C. and after a waiting time of 15 minutes. A precise description of the measurement protocol is given in the examples.

The invention provides a precipitated silica, characterized by the following physicochemical data:

| | |
|---|---|
| BET surface area | from 50 to 700 $m^2/g$ with the preferential ranges 100–300 $m^2/g$, 150–220 $m^2/g$, 180–210 $m^2/g$, |
| DBP absorption | from 100 to 450 g/100 g with the preferential ranges 250–450 g/100 g, 280–450 g/100 g, |
| Choline chloride | from 50 to 400 g/100 g with the absorption preferential ranges 240–400 g/100 g, 280–400 g/100 g (75% by weight aqueous solution), |
| CTAB surface area | from 50 to 350 $m^2/g$ with the preferential ranges 100–250 $m^2/g$, 130–200 $m^2/g$, | the ratio of the DBP absorption to the choline chloride absorption, as a measure of the adsorption of a nonpolar substance and of a polar substance, being less than 1.07, preferably less than 1.05, with very particular preference less than 1.03.

Since silicas or silicates possess different affinities for hydrophobic, i.e., nonpolar, and hydrophilic, i.e., polar, compounds, two measurements are necessary for complete characterization of this property. The DBP number is used as a measure of an affinity of silicas for hydrophobic compounds; the choline chloride absorption is used as a measure of the affinity of silicas for hydrophilic compounds. The ratio of these DBP/choline chloride absorption figures therefore reflects a new physical property.

The silicates or precipitated silicas of the invention may additionally be characterized by the modified Sears number. The modified Sears number is determined by the techniques described in the examples/methods and may be greater than 20, preferably greater than 25, with particular preference greater than 28. Preferably the modified Sears number is 45 or less.

The preferred aqueous silicate solution is sodium silicate solution; as the Brønsted acid, sulfuric acid, hydrochloric acid, carbonic acid or acetic acid may be used. As the Lewis acid it is possible to use $Al^{3+}$ ions, in the form for example of the sulfate.

The BET surface area is determined in accordance with ISO 5794/1, Annex D, incorporated herein by reference, the CTAB surface area in accordance with ASTM D 3765-92, incorporated herein by reference, the DBP absorption in accordance with the protocol described in the annex.

The precipitated silica suspensions prepared by the process of the invention may be filtered conventionally and the filter cake may be washed with water. The filter cake obtained in this way is liquefied, where appropriate, and may be dried by the customary drying process, such as rotary tube furnace, Büttner dryer, spin-flash dryer, pulse combustion dryer, spray dryer, or in a nozzle tower. Further, purely physical treatment by granulation and/or grinding is likewise possible. Also possible is a water repellency treatment or coating with waxes.

The silicates or precipitated silicas of the invention may be used in particular as carriers, for example for feed additives such as formic acid, propionic acid, lactic acid, phosphoric acid, choline chloride solution or plant extracts, tagatese extract for example.

Furthermore, the precipitated silicas of the invention may be used as carrier material for chemical intermediates such as melamine resins or coatings additives or in the laundry detergent industry as carriers for fragrances or detergents.

Moreover, the silicates or precipitated silicas of the invention may be used as a filler in elastomers/plastics, battery separators, toothpastes, catalyst supports, or as a flocculation assistant.

The following examples and measurement protocols are intended to illustrate the invention without restricting its scope.

EXAMPLES

General Experimental Protocol

Example 1–8

Water is charged to a precipitation vessel with a capacity of 2 $m^3$ (applies to all pilot-scale trials; laboratory trials: 40 l; plant trials: 80 $m^3$) and a. certain amount of waterglass (i.e., sodium silicate solution) is metered in. The values for the density of the sodium silicate solution, sulfuric acid, the $SiO_2$ content, $Na_2O$ content, temperature, and the alkali number (AN number) are evident from the tables. After the target temperature has been reached, sodium silicate solution and sulfuric acid are metered in. Thereafter, sulfuric acid continues to be metered in at the same rate until a pH of 3.5 is reached. The suspension with the described solids content is filtered on filter presses (membrane filter presses) and then prepared for drying. The filter cake is liquefied by adding sulfuric acid, using a shearing unit, until the desired viscosity and pH are reached. The feed is then dried.

List of Abbreviations:

AN=alkali number

WGL charge=waterglass charge=initial charge of sodium silicate solution

WGL=waterglass

VA=time at which the viscosity increases sharply, also referred to as the gel point Fc=precipitation rate in [mol/(1·min)], defined by ml/min (acid inflow)·mol/1 (acid molarity) 1 (initial charge)

% TS feed=% solids content of feed to dryer

GV-Din=loss on ignition to DIN

LF=conductivity

CC absorption=choline chloride absorption

|  | Example | | | |
|---|---|---|---|---|
|  | 1 | 2 | 3 | 4 |
| Trial No. | 7508 | 7504 | 7487 | 7491 |
| AN | 30 | 40 | 40 | 40 |
| Water charge (l) | 1359 | 1220 | 1314 | 1220 |
| WGL charge (l) | 145.3 | 186.1 | 197.6 | 184.1 |
| Temperature (° C.) | 85 | 85 | 85 | 85 |
| WGL metered (l) | 344.2 | 211.4 | 247.9 | 249.2 |
| Acid metered (l) | 26.32 | 16.42 | 19.32 | 20.15 |
| VA (min) | 22.50 | 37.00 | 38.50 | 41.00 |
| Precipitation period (min) | 60 | 55 | 55 | 65 |
| Reacidification amount (l) | 20.00 | 22.30 | 25.11 | 22.86 |
| Reacidification time (min) | 21 |  | 39 | 156 |
| Fc | 5.52 | 4.01 | 4.39 | 4.17 |
| g/l (solids content of the earth suspension) | 94.8 | 92.5 | 97.7 | 99.2 |
| Waterglass analysis |  |  |  |  |
| Density (g/ml) | 1.346 | 1.346 | 1.349 | 1.349 |
| % $SiO_2$ | 27.2 | 27.2 | 27.3 | 27.3 |
| % $Na_2O$ | 7.99 | 7.99 | 8.08 | 8.08 |
| Sulfuric acid (mol/l $H_2SO_4$) | 18.14 | 18.14 | 18.14 | 18.14 |
| Dryer | Nozzle tower dryer | Nozzle tower dryer | Nozzle tower dryer | Nozzle tower dryer |
| pH of feed | 3.9 | 3.8 | 3.8 | 3.8 |
| Viscosity (mPa * s) | 40 | 75 | 110 | 120 |
| % TS feed | 17.3 | 18.3 | 19.7 | 20.3 |
| Analysis |  |  |  |  |
| GV-DIN (%) | 5.2 | 4.9 | 4.9 | 4.9 |
| Water (%) | 6.2 | 5.3 | 6.3 | 6.0 |
| pH | 6.5 | 6.5 | 6.9 | 6.1 |
| LF (µS/cm) | 610 | 600 | 550 | 650 |
| $N_2$ surface area ($m^2/g$) | 199 | 189 | 167 | 165 |
| CTAB surface area ($m^2/g$) | 148 | 127 | 120 | 113 |
| DBP number (g/100 g) (corrected, i.e., for anhydrous material) | 279 | 281 | 270 | 270 |
| Sears number (V2) | 31.3 | 30.9 | 29.4 | 29.5 |
| CC absorption | 276 | 282 | 270 | 275 |
| Ratio of DBP/CC absorption | 1.0109 | 0.9965 | 1.0000 | 0.9818 |

|  | Example | | | |
|---|---|---|---|---|
|  | 5 | 6 | 7 | 8 |
| Trial No. | 7397 | 7362 | 7370 | 7420 |
| AN | 20 | 30 | 30 | 40 |
| Water charge (l) | 1651 | 1499 | 1459 | 1224 |
| WGL charge (l) | 108.4 | 148.8 | 148.8 | 185.3 |
| Temperature (° C.) | 85 | 85 | 85 | 85 |
| WGL metered (l) | 345.0 | 441.8 | 542.5 | 224.4 |
| Acid metered (l) | 28.40 | 36.00 | 32.78 | 18.44 |
| VA (min) | 24.75 | 27.75 | 27.25 | 40.25 |
| Precipitation period (min) | 40 | 65 | 60 | 60 |
| Reacidification amount (l) | 20.42 | 28.41 | 24.70 | 26.37 |
| Reacidification time (min) | 41 | 63 | 56 | 94 |
| Fc | 7.21 | 5.96 | 6.03 | 3.86 |
| g/l (solids content of the earth suspension) | 79.3 | 104.0 | 100.0 | 92.5 |
| Waterglass analysis |  |  |  |  |
| Density (g/ml) | 1.346 | 1.348 | 1.348 | 1.351 |
| % $SiO_2$ | 27.4 | 27.2 | 27.2 | 27.6 |
| % $Na_2O$ | 8.03 | 8.02 | 8.02 | 8.01 |
| Sulfuric acid (mol/l $H_2SO_4$) | 18.87 | 17.74 | 17.64 | 17.70 |
| Dryer | Nozzle tower dryer | Nozzle tower dryer | Nozzle tower dryer | Nozzle tower dryer |
| pH of feed | 3.6 | 3.6 | 3.4 | 3.6 |
| Viscosity (mPa * s) | 75 | 60 | 33 | 90 |
| % TS feed | 16.3 | 16.9 | 15.3 | 19.8 |
| Analysis |  |  |  |  |
| GV-DIN (%) | 5.1 | 5.3 | 5.8 | 5.6 |
| Water (%) | 5.8 | 6.2 | 5.0 | 5.9 |
| pH | 6.8 | 6.7 | 6.3 | 6.6 |
| LF (µS/cm) | 490 | 510 | 530 | 550 |
| $N_2$ surface area ($m^2/g$) | 240 | 175 | 185 | 137 |
| CTAB surface area ($m^2/g$) | 200 | 135 | 148 | 115 |
| DBP number (g/100 g) | 247 | 293 | 292 | 276 |

|  |  |  |  |  |
|---|---|---|---|---|
| (corrected, i.e., for anhydrous material) |  |  |  |  |
| Sears number (V2) | 31.0 | 31.5 | 30.8 | 28.5 |
| CC absorption | 233 | 285 | 294 | 279 |
| Ratio of DBP/CC absorption | 1.0601 | 1.0281 | 0.9932 | 0.9892 |

|  | Example | | | |
|---|---|---|---|---|
|  | Hubersil 5170 9 | HiSil SC72 10 | Sipernat 22 11 | Sipernat 2200 12 |
| Trial No. |  |  |  |  |
| AN |  |  |  |  |
| Water charge (l) |  |  |  |  |
| WGL charge (l) |  |  |  |  |
| Temperature (° C.) |  |  |  |  |
| WGL metered (l) |  |  |  |  |
| Acid metered (l) |  |  |  |  |
| VA (min) |  |  |  |  |
| Precipitation period (min) |  |  |  |  |
| Reacidification amount (l) |  |  |  |  |
| Reacidification time (min) |  |  |  |  |
| Fc |  |  |  |  |
| g/l (solids content of the earth suspension) |  |  |  |  |
| Waterglass analysis |  |  |  |  |
| Density (g/ml) |  |  |  |  |
| % $SiO_2$ |  |  |  |  |
| % $Na_2O$ |  |  |  |  |
| Sulfuric acid (mol/l $H_2SO_4$) |  |  |  |  |
| Dryer | Granulation | Nozzle tower dryer | Spray dryer | Nozzle tower dryer |
| pH of feed |  |  |  |  |
| Viscosity (mPa * s) |  |  |  |  |
| % TS feed |  |  |  |  |
| Analysis |  |  |  |  |
| GV-DIN (%) |  |  |  |  |
| Water (%) | 6.0 | 5.7 | 5.0 | 5.0 |
| pH |  |  |  |  |
| LF (μS/cm) |  |  |  |  |
| $N_2$ surface area (m²/g) |  |  |  |  |
| CTAB surface area (m²/g) |  |  |  |  |
| DBP number (g/100 g) | 204 | 311 | 270 | 255 |
| (corrected, i.e., for anhydrous material) |  |  |  |  |
| Sears number (V2) | 18.4 | 23.5 |  |  |
| CC absorption | 165 | 270 | 235 | 231 |
| Ratio of DBP/CC absorption | 1.2364 | 1.1519 | 1.149 | 1.1039 |

Determining the Modified Sears Number of Silicas, Silicates and Hydrophobic Silicas 1. Scope Free OH groups are detectable by titration with 0.1 N KOH in the range from pH 6 to pH 9.

2. Apparatus

| 2.1 | Precision balance to 0.01 g precisely |
|---|---|
| 2.2 | Memotitrator DL 70, Mettler, equipped with 10 ml and 20 ml buret, 1 pH electrode and 1 pump (e.g., NOUVAG pump, type SP 40/6) |
| 2.3 | Printer |
| 2.4 | Titration vessel 250 ml, Mettler |
| 2.5 | Ultra-Turrax 8000–24,000 rpm |
| 2.6 | Thermostated waterbath |
| 2.7 | 2 dispenser 10–100 ml for metering methanol and deionized water |
| 2.8 | 1 dispenser 10–50 ml for metering deionized water |
| 2.9 | 1 measuring cylinder 100 ml |
| 2.10 | IKA universal mill M20 |

3. Reagents

| 3.1 | Methanol p.a. |
|---|---|
| 3.2 | Sodium chloride solution (250 g NaCl p.a. in 1000 ml deionized water) |
| 3.3 | 0.1 N hydrochloric acid |
| 3.4 | 0.1 N potassium hydroxide solution |
| 3.5 | Deionized water |
| 3.6 | Buffer solutions pH 7 and pH 9 |

4. Procedure

| 4.1 | Sample preparation<br>Grind about 10 g of sample for 60 seconds in the IKA universal mill M20. Important: Since only very finely ground samples lead to reproducible results, these conditions must be observed strictly. |
|---|---|
| 4.2 | Analytical procedure |
| 4.2.1 | Weigh out 2.50 g of the sample prepared in accordance with section 4.1 into a 250 ml titration vessel. |
| 4.2.2 | Add 60 ml of methanol p.a. |
| 4.2.3 | After complete wetting of the sample, add 40 ml of deionized water. |

-continued

| 4.2.4 | Disperse for 30 seconds using the Ultra-Turrax at a speed of about 18,000 rpm. |
| --- | --- |
| 4.2.5 | Rinse sample particles adhering to the vessel edge and stirrer into the suspension using 100 ml of deionized water. |
| 4.2.6 | Condition sample to 25° C. in a thermostated water bath (for at least 20 minutes). |
| 4.2.7 | Calibrate pH electrode with the buffer solutions pH 7 and pH 9. |
| 4.2.8 | The sample is titrated in the Memotitrator DL 70 in accordance with method S 911. If the course of titration is unclear, a duplicate determination is carried out subsequently. |

The results printed out are as follows:

| | pH |
| --- | --- |
| $V_1$ | in ml/5 g |
| $V_2$ | in ml/5 g |

Principle:

First of all the initial pH of the suspension is measured, then according to the result the pH is adjusted to 6 using KOH or HCl. Then 20 ml of NaCl solution are metered in. The titration is then continued to a pH of 9 using 0.1 N KOH.

Sears Numbers:

| Si – OH + NaCl | ⇨ | Si – ONa + HCl |
| --- | --- | --- |
| HCl + KOH | ⇨ | KCl + $H_2O$ |

Calculation $$V_1 = \frac{V*5}{E}$$

$$V_2 = \frac{V*5}{E}$$

$V_1$ = ml $KOH$ or ml $HCl$ to pH 6/5 g of substance $V_2$ = ml $KOH$ consumption to pH 9/5 g of substance $E$ = initial mass Titraton was conducted on a Memotitrator DL 70 with a switch-off delay time of 2s.

Determining the Alkali Number:

The alkali number determination, referred to below for short as AN determination, is the consumption of hydrochloric acid in a direct potentiometric titration of alkaline charges or suspensions to a pH of 8.3 (viewed historically: pH 8.3 corresponds to the color change point of phenolphthalein); this gives the free alkali content of the solution or suspension.

The pH meter is calibrated at room temperature, the combined electrode is equilibrated to 40° C., and the sample mixture is then conditioned at 40° C., and on reaching that temperature the titration is conducted.

Because of the fairly long time for equilibrium to be established between the silica/silicate at the specified pH—in this case 8.3—a waiting time is necessary until the consumption of acid is finally read off. Extensive investigations have found that for the AN determination a waiting time of 15 minutes must be observed, after which the equilibrium has established itself stably and good reproducibility is ensured.

Description of Method:

pH Meter Calibration:
Calibrating temperature of buffer solutions 20° C.
Temperature equilibration 20° C.

Measurement of Suspension:
Temperature equilibration of pH meter at 40° C.
50 ml of suspension
50 ml of distilled water
Hydrochloric acid c=0.5 mol/l
Condition suspension to 40° C.
Determine acid consumption after 15 min titration time
Titration end at pH 8.3

Accuracy of Method: +/−0.1 ml Acid Consumption

Determining the Maximum Choline Chloride Absorption:

Test Means:

A. Test Apparatus:
250 ml glass beaker, high form
Spatula
Precision balance

B. Test Substances:
75% strength choline chloride solution [choline chloride, ultrapure (Merck)]Silica under test Calibration Notes When a new delivery test solution is received, it must be examined comparatively with the quality used up until that time.

Before use, the balances are to be tested for functionality and serviced annually.

Procedure:

10 g of the carrier silica under test are weighed out into a 250 ml glass beaker, high form, and 75% strength choline chloride solution is added dropwise, while stirring with the spatula. The mixture is observed continuously to check when the maximum absorption has been reached. When viewed closely, it is possible to make out white silica particles which stand out distinctly from waxlike (saturated) particles. The maximum choline chloride absorption has been achieved when there are no longer any unladen particles in the mixture and this mixture is not yet waxlike/greasy.

Evaluation:

$$\text{Max. choline chloride absorption in g/100 g} = \frac{(a-10) \times 100}{10}$$

$a$ = total weight

German application 101 12 441.4 filed Mar. 15, 2001 is incorporated herein by reference.

In the invention process, the "metered addition" of aqueous silicate solution and acid may be addition to a pre-existing aqueous silicate solution, or simply to, e.g., an empty vessel (e.g., controlled mixing). The rate of addition of components is guided by the control of the alkali number, and is within the skill of the ordinary artisan in view of the disclosure above.

The invention claimed is:

1. A silicate having the following physicochemical characteristics:

| | |
|---|---|
| BET surface area | from 50 to 700 m$^2$/g |
| DBP absorption | from 100 to 450 g/100 g |
| Choline chloride absorption | from 150 to 400 g/100 g (75% absorption by weight aqueous solution) |
| CTAB surface area | from 50 to 350 m$^2$/g |
| DBP/choline chloride absorption | less than 1.07. |

2. A composition comprising the silicate of claim 1, and between 0.01 and 26% by weight based on total weight of an electrolyte.

3. The silicate of claim 1, comprising between 1 and 50% by weight based on total weight of at least one metal ion selected from the group consisting of Al, Mg, Ca, Ti, Zr, Fe and mixtures thereof.

4. The silicate of claim 1, having a modified Sears number of from at least 20 to 45.

5. The silicate of claim 1, having a BET surface area of 180–210 m$^2$/g, a DBP adsorption of 280–450 g/100 g, and a CTAB surface area of 130–200 m$^2$/g.

6. A process for preparing precipitated silicate, comprising
simultaneously metering into an aqueous silicate solution more aqueous silicate solution and a Lewis and/or Brønsted acid to provide a mixture,
acidifying the mixture to a pH of 7–3.0 to provide an acidified mixture
optionally filtering the acidified mixture to obtain a filtered precipitated silicate,
optionally drying the filtered precipitated silicate,
wherein the metered addition of the aqueous silicate solution and the Lewis and/or Brønsted acid is carried out while maintaining a constant alkali number in the mixture of at least 1,
wherein at least one metal ion is added in the form of a salt or solution thereof prior to or during the simultaneous addition of acqueous silicate solution and Lewis and/or Brønsted acid, and
wherein said silicate has the following physicochemical characteristics:

| | |
|---|---|
| BET surface area | from 50 to 700 m$^2$/g |
| DBP absorption | from 100 to 450 g/100 g |
| Choline chloride absorption | from 150 to 400 g/100 g (75% absorption by weight aqueous solution) |
| CTAB surface area | from 50 to 350 m$^2$/g |
| DBP/choline chloride absorption | less than 1.07. |

7. The process of claim 6 wherein the alkali number is at least 15.

8. The process of claim 6, further comprising the addition of an electrolyte prior to or during the simultaneous addition of aqueous silicate solution and Lewis and/or Brønsted acid.

9. The process of claim 6, wherein the at least one metal ion is selected from the group consisting of Al, Ti, Zr, Fe, Mg, Ca and mixtures thereof.

10. A method comprising contacting the precipitated silicate of claim 1 with a feed additive, a chemical intermediate, or a laundry detergent component.

11. A method comprising contacting the precipitated silicate of claim 1 with formic acid, propionic acid, lactic acid, phosphoric acid, choline chloride solution, a plant extract, a melamine resin, a coatings additive, a fragrance, or a detergent.

12. An elastomer, plastic, battery separator, toothpaste, catalyst support or flocculation assistant comprising the precipitated silicate of claim 1.

13. A process for preparing precipitated silicate, comprising:
simultaneously metering into a vessel an aqueous silicate solution and a Lewis and/or Brønsted acid to provide a mixture,
acidifying the mixture to a pH of 7–3 to provide an acidified mixture,
optionally filtering the acidified mixture to obtain a filtered precipitated silicate,
optionally drying the filtered precipitated silicate,
wherein the metered addition of the aqueous silicate solution and the Lewis and/or Brønsted acid is carried out while maintaining a constant alkali number in the mixture of at least 1,
wherein at least one metal ion is added in the form of a salt or solution thereof prior to or during the simultaneous addition of aqueous silicate solution and Lewis and/or Brønsted acid, and
wherein said silicate has the following physicochemical characteristics:

| | |
|---|---|
| BET surface area | from 50 to 700 m$^2$/g |
| DBP absorption | from 100 to 450 g/100 g |
| Choline chloride absorption | from 150 to 400 g/100 g (75% absorption by weight aqueous solution) |
| CTAB surface area | from 50 to 350 m$^2$/g |
| DBP/choline chloride absorption | less than 1.07. |

14. The process of claim 13 wherein the alkali number is at least 15.

15. The process of claim 13, further comprising the addition of an electrolyte prior to or during the simultaneous addition of aqueous silicate solution and Lewis and/or Brønsted acid.

16. The process of claim 13, wherein the at least one metal ion is selected from the group consisting of Al, Ti, Zr, Fe, Mg, Ca and mixtures thereof.

17. A composition comprising the silicate of claim 5, and between 0.01 and 26% by weight based on total weight of an electrolyte.

18. The silicate of claim 1, comprising between 1 and 50% by weight based on total weight of at least one metal ion selected from the group consisting of Al, Mg, Ca, Ti, Fe and mixtures thereof.

19. The process of claim 6, wherein the at least one metal ion is selected from the group consisting of Al, Ti, Fe, Mg, Ca and mixtures thereof.

20. The process of claim 13, wherein the at least one metal ion is selected from the group consisting of Al, Ti, Fe, Mg, Ca and mixtures thereof.

* * * * *